United States Patent
Mahan et al.

(10) Patent No.: US 9,247,689 B2
(45) Date of Patent: Feb. 2, 2016

(54) ACTIVE MANAGEMENT OF PLANT CANOPY TEMPERATURE AS A TOOL FOR MODIFYING PLANT METABOLIC ACTIVITY

(71) Applicant: The United States of America, as represented by the Secretary of Agriculture, Washington, DC (US)

(72) Inventors: James R. Mahan, Lubbock, TX (US); John J. Burke, Lubbock, TX (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 118 days.

(21) Appl. No.: 14/136,406

(22) Filed: Dec. 20, 2013

(65) Prior Publication Data
US 2015/0173301 A1  Jun. 25, 2015

(51) Int. Cl.
*A01G 25/16* (2006.01)
*A01G 1/00* (2006.01)
*G01K 13/00* (2006.01)

(52) U.S. Cl.
CPC .............. *A01G 1/001* (2013.01); *G01K 13/00* (2013.01)

(58) Field of Classification Search
CPC ... A01G 25/16; A01G 25/167; A01G 27/003; A01G 1/001; A01G 13/00; A01G 7/06; A01G 25/165
USPC ........ 47/58.1 FV, 58.1 R; 137/78.2, 78.3, 79; 700/284
See application file for complete search history.

(56) References Cited

U.S. PATENT DOCUMENTS

| | | | | |
|---|---|---|---|---|
| 4,755,942 A * | 7/1988 | Gardner et al. | ................ | 700/284 |
| 4,876,647 A * | 10/1989 | Gardner et al. | ................ | 700/284 |
| 5,539,637 A | 7/1996 | Upchurch et al. | | |
| 5,710,047 A * | 1/1998 | Murray | ........................... | 436/94 |
| 6,597,991 B1 * | 7/2003 | Meron et al. | ....................... | 702/3 |
| 2008/0040973 A1 * | 2/2008 | Nelson et al. | .............. | 47/58.1 R |
| 2014/0096445 A1 * | 4/2014 | Bassi et al. | ............... | 47/58.1 FV |

OTHER PUBLICATIONS

Burke, John J., "Evaluation of Source Leaf Responses to Water-Deficit Stresses in Cotton Using a Novel Stress Bioassay", Plant Physiology, Jan. 2007, vol. 143, pp. 108-121.
(Continued)

*Primary Examiner* — Monica Williams
(74) *Attorney, Agent, or Firm* — John D. Fado; Robert D. Jones; Lesley Shaw

(57) ABSTRACT

The water-deficit stress of plants or crops is managed using plant temperatures to maximize product quality. The temperature of the target plant is repeatedly measured over a period of interest, and after each measurement, the plant temperature is compared with a predetermined plant setpoint temperature associated with a desired water-deficit stress level, above which temperature the plant is deemed to be in an undesired metabolic state. If the measured plant temperature is greater than the setpoint temperature, and humidity is not restrictive to plant cooling, then irrigation can be triggered to retain the plant within the desired stressed level, as determined by the temperature of the plant. By this method, irrigation can be withheld to increase plant temperature or applied to reduce plant temperature. The temperature of the plant is thus continuously increased and decreased relative to a desired temperature value that is indicative of a desired water-deficit stress.

9 Claims, 9 Drawing Sheets

(56) References Cited

OTHER PUBLICATIONS

Burke, J.J., et al., "Selection System for the Stay-Green Drought Tolerance Trait in Sorghum Germplasm", Agronomy Journal, vol. 102, Issue 4, 2010, pp. 1118-1122.

Maxwell, Kate, et al., "Chlorophyll fluorescense—a practical guide", Journal of Experimental Botany, vol. 51, No. 345, Apr. 2000, pp. 659-668.

* cited by examiner

ACTIVE MANAGEMENT OF PLANT CANOPY TEMPERATURE AS A TOOL FOR MODIFYING PLANT METABOLIC ACTIVITY

BACKGROUND OF THE INVENTION

1. Field of the Invention

The invention relates to a method and apparatus for obtaining desired water-deficit stress levels in a plant by managing plant temperature through irrigation control. Plant temperature is correlated with the level of water-deficit stress. Desired water-deficit stress levels can be obtained by managing plant temperatures through an interactive plant temperature monitoring and irrigation dispensing system.

2. Description of the Prior Art

Plants, as sedentary poikilotherms, are subject to thermal variation. Environmental temperatures vary according to both diurnal and seasonal patterns. The thermal environment of many temperate plants is bounded by lethally low temperatures that define their growing seasons. Within the non-lethal thermal range, the plant is subjected to a continuously variable thermal environment. Temperature plays an important role in plant environment interactions and is perhaps one of the most pervasive influences on plant growth and development. Environmental temperature has been used to predict and explain plant growth and development in terms of heat units or growing degree-day approaches.

The relationship between plant temperature and environmental temperature is potentially rather complex. In the literature plant temperature is often assumed to be similar to the air temperature though it is generally acknowledged that under water deficits the temperature of the plant can be higher than that of the air. Direct measurement of plant temperature using contact thermometers and thermistors is possible though often time consuming and tedious. Non-contact thermal measurements using infrared thermometers have become increasingly common with advances in field. Lower cost infrared thermometers are now available for use in production agricultural settings. The temperature of plant and crop canopies can now be measured near-continuously over seasonal time scales.

The concept of thermal optimality of organisms is well documented. Biochemical reactions are inherently thermally dependent with reaction rates relatively sensitive to temperature. Given that the temperature of a plant is related to that of its environment, and that the temperature of the environment is constantly variable, the rates of the biochemical reactions of the plant are continuously affected by temperature in a potentially complex manner. The concept of a metabolically optimal state, while perhaps obvious in principle, is potentially complex in definition.

In the simplest sense an optimal metabolic state in a plant is the metabolic condition apparent in the plant when it is functioning in the absence of external factors that limit its performance. In the more common parlance it refers to a non-stressed condition. While the existence of a non-stressed, or optimal condition, of a plant is recognized as an ideal, the reality is that plants often function under external constraints.

In an agricultural crop, the optimal metabolic state may not be the same as the desired agricultural state. Such a desired agricultural state is defined anthropomorphically in terms of the desired agronomic outcome defined with respect to the agricultural product. Issues of yield and quality are central to the desired agronomic outcome.

In a forage crop, total seasonal biomass may be the desired agronomic outcome while in an oilseed crop the yield and quality of the oil may be used to define a desired agronomic outcome. In cotton, biomass, a result of optimal metabolism, is of value only to the extent to which it is related to the desired agronomic outcome defined in terms of fiber yield and quality. Fully optimized vegetative growth in cotton is often undesirable as it is associated with reduced harvest index and negative fiber characteristics.

In an organism that is subject to thermal variation, the rate of enzyme reactions will vary continuously. Increases in temperature are known to increase plant tissue respiration, as exemplified by a study of soybean (Glycine max) leaves that showed that respiration increased by a factor of 2.5 between 18° C. and 26° C. average night temperatures [Bunce. 2005. Response of respiration of soybean leaves grown at ambient and elevated carbon dioxide concentrations to day-to-day variation in light and temperature under field conditions. Ann Bot (Lond) 95: 1059-1066]. It has been demonstrated that the thermal dependence of the kinetics of enzymes can be used to define biologically optimal temperatures of crops. Irrigation management based upon thermal optima defined in terms of enzyme kinetic properties has proven to optimize cotton production. Kinetic properties of enzymes responsible for herbicide activity have been used to explain thermal dependency of some aspects of herbicide efficacy. This approach was used to define optimal thermal ranges for herbicide efficacy. The thermal dependence of kinetics of malate synthase from cotton was used to develop a model that predicts optimal cotton emergence under thermal variation.

It is well established that irrigation based upon canopy temperature measurements is capable of altering the relationship between the temperature of the plant canopy and the plant's thermal environment. In the most general sense, as plant water use increases canopy temperature decreases. The canopy temperatures of plants experiencing water deficits are generally elevated relative to those that are well-watered. This relationship provides the basis for the BIOTIC irrigation management protocol (biologically identified optimal temperature interactive console) that is designed to maintain crop water status in an optimal condition (Upchurch et al., U.S. Pat. No. 5,539,637). Such an approach serves to prevent non-optimal water and metabolic states in the crop. The temperature of a plant indicates the water status of the plant and, when compared to a biologically-based indicator of optimality, a measure of optimal and non-optimal metabolic status.

However, despite these and other advances, the need remains for improved irrigation control systems which are capable of maximizing product quality, and which are suitable for use in environments where water availability is limited.

SUMMARY OF THE INVENTION

We have now invented a novel process and device for managing irrigation of plants or crops using crop canopy temperature measurements. We have discovered that plant metabolism can be managed through irrigation control based on water-deficit stress temperature setpoints.

Previous work has focused on irrigation management based on providing sufficient water for the plant to maintain its temperature at or within a range that represents its inherent biological optimum. In contrast, we have now developed an approach that controls the plant temperature to a desired level of water-deficit stress.

In this process, the temperature of the target plant is measured, preferably in a continuous or near-continuous manner (e.g., 1 minute) over a period of interest. The temperature can be measured by a number of means including thermocouples, thermistors or infrared radiometers (infrared thermometers).

Hereafter plant temperature refers to the value returned by the monitoring device and as such could represent a single plant part (e.g., a leaf, a flower, a fruit) or a collection of parts in the case of a radiometric thermal measurement (a plant canopy). After each measurement, the plant temperature is compared to a desired water-deficit stress setpoint temperature. The desired water-deficit stress setpoint temperature is defined herein as the approximate plant temperature that is associated with a desired, predetermined stress level (which may be hydrological or thermal) wherein the plant is in a non-optimal metabolic status. At plant temperatures above this desired water-deficit stress setpoint temperature, the plant is, as defined by the method, in a non-desirable thermal state. This thermal state is used as an indicator of the non-optimal metabolic state of the plant.

The correlation between plant temperature and the level of water-deficit stress provides a signal that can result in maintenance of a desired water-deficit stress. In this implementation, that is based on irrigation management, two options exist: apply irrigation or withhold irrigation. Withholding irrigation is accomplished simply. In the event that the signal suggests that an irrigation would result in more desirable plant temperature, the effectiveness of an irrigation must be assessed in terms of the ability of additional water to result in a decrease in plant temperature. This is accomplished by determining if the plant temperature is a result of an environmental as opposed to plant related limit on transpirational cooling. This is accomplished by comparing the plant temperature to an environmentally-based limit on plant temperature that is calculated from humidity of the air in the vicinity of the plant.

If the humidity is determined to be restrictive to plant cooling, then irrigation is not indicated and the canopy temperature measurement is repeated at its designated time. However, if both the measured canopy temperature is greater than the desired water-deficit stress setpoint temperature, and the humidity is not restrictive to plant cooling, then irrigation or an irrigation signal is initiated. The desired water-deficit stress setpoint temperatures can be changed during development to achieve desired metabolic states during specific developmental periods.

The invention also relates to an apparatus for automatically managing irrigation using the above-described process. The apparatus includes sensors for measuring the target plant's temperature and the atmospheric humidity. The apparatus also includes a microprocessor in communication with the sensors which is capable of comparing the measured canopy temperature to the water-deficit stress setpoint temperature, and for comparing the measured humidity to a limiting humidity condition. Generation of a signal indicating a non-desirable stress level (a non-desired metabolic state) when the plant temperature is above or below said non-optimal metabolic setpoint temperature may be effected by signal generator operatively connected to the microprocessor.

In accordance with this discovery, it is an object of this invention to provide an improved method and apparatus for managing the metabolic state of plants.

Another object of the invention is to provide a method and apparatus for managing irrigation of plants to regulate plant temperatures and hence maximize desirable agronomic outcomes.

Yet another object of the invention is to provide a method and apparatus for managing irrigation of plants based upon the biology of the plant and site-specific integrated environmental conditions.

Other objects and advantages of the invention will become apparent from the ensuing description.

DETAILED DESCRIPTION OF THE INVENTION

Figure 1A:
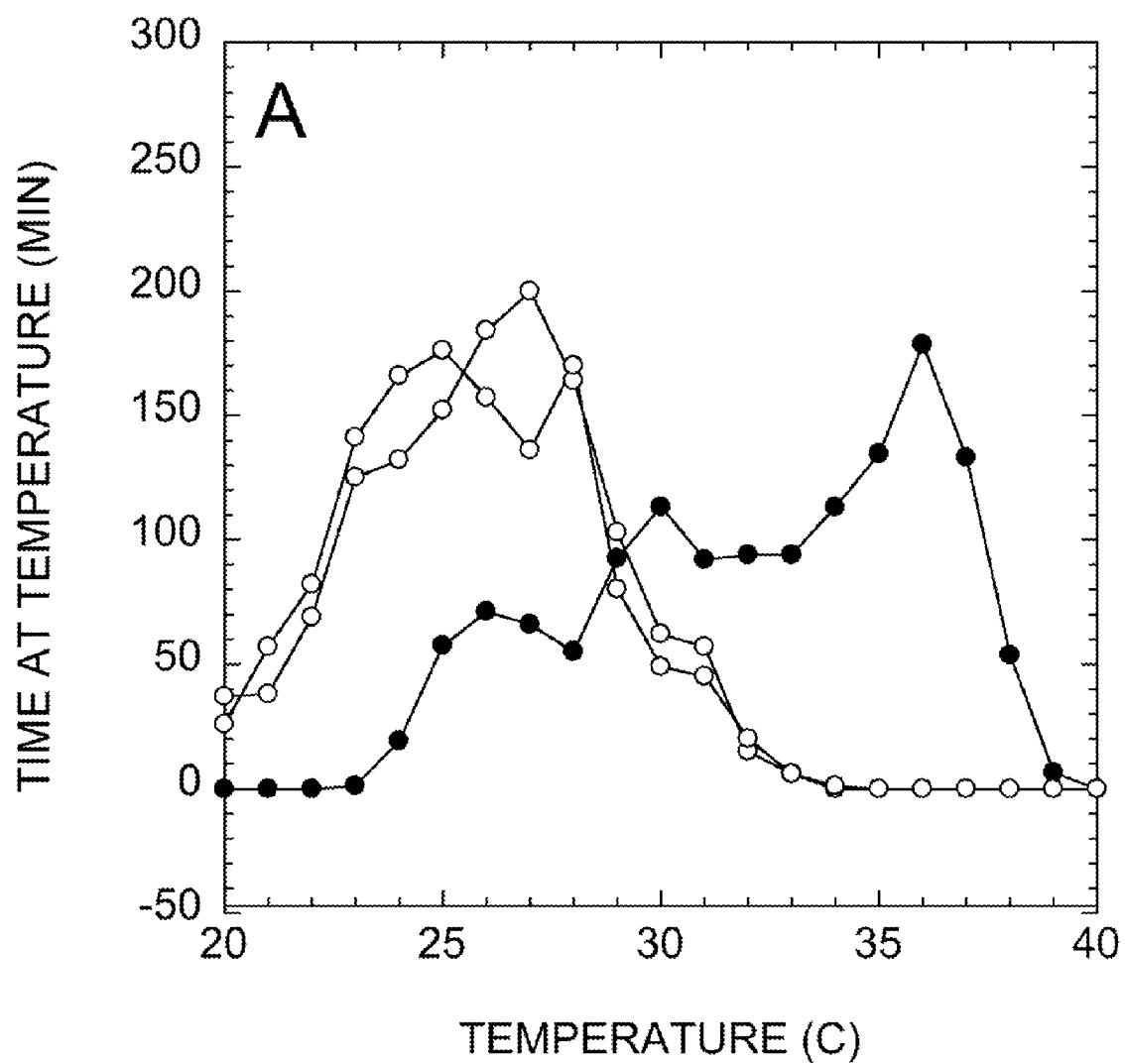
FIGS. 1A-D show the distribution of canopy temperatures over the 10-day period for a collection of cotton plants in a greenhouse that were irrigated based on 4 temperature setpoints (A=28°, B=30°, C=32°, and D=34° C.). Air temperature is shown on each figure as a point of reference. The 5-min temperature values were binned at 1° C. increments from 20° C. to 50° C. The total minutes at each temperature over the 10-day interval is shown on the y-axis.
Figure 1B:
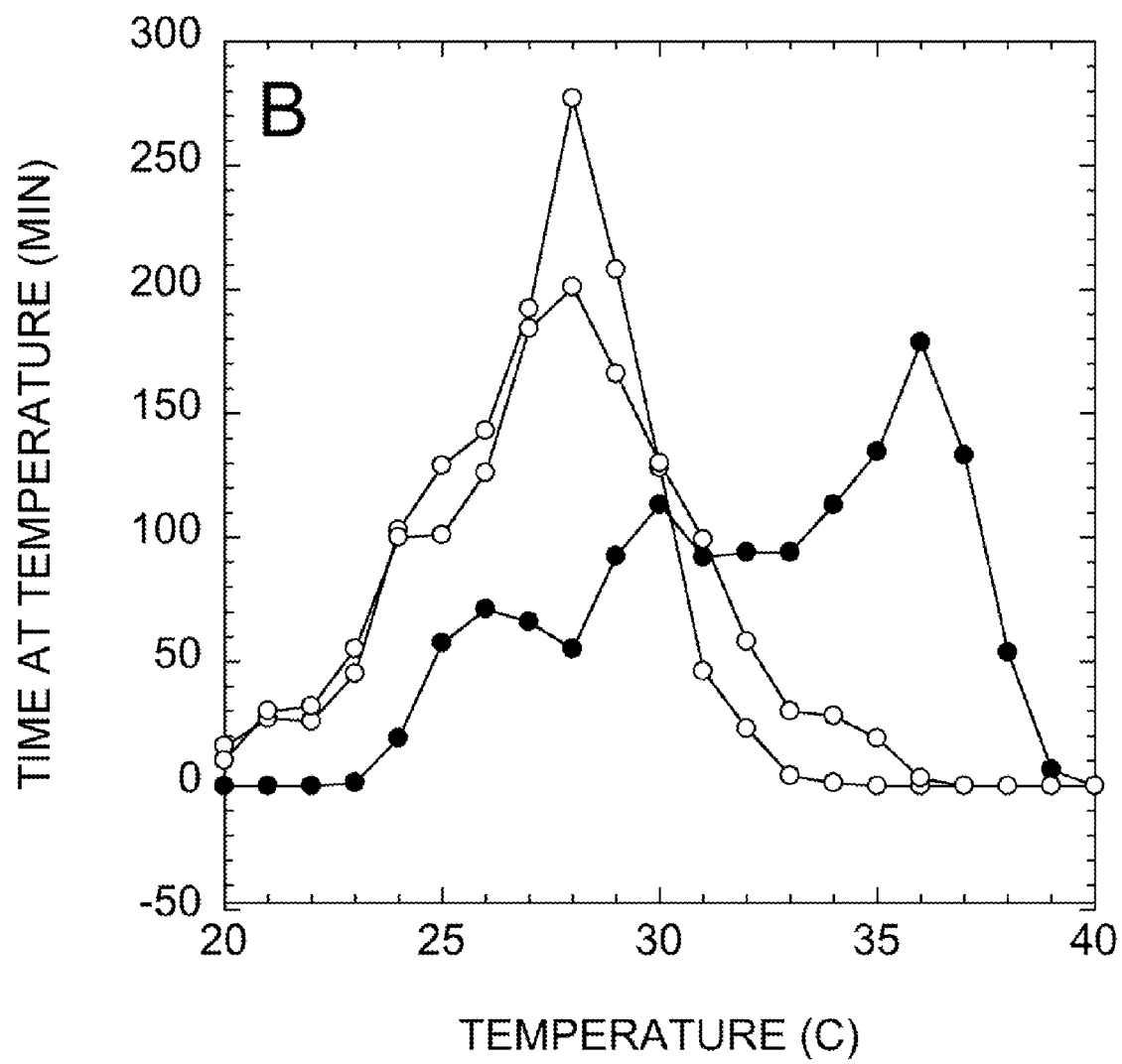
Figure 1C:
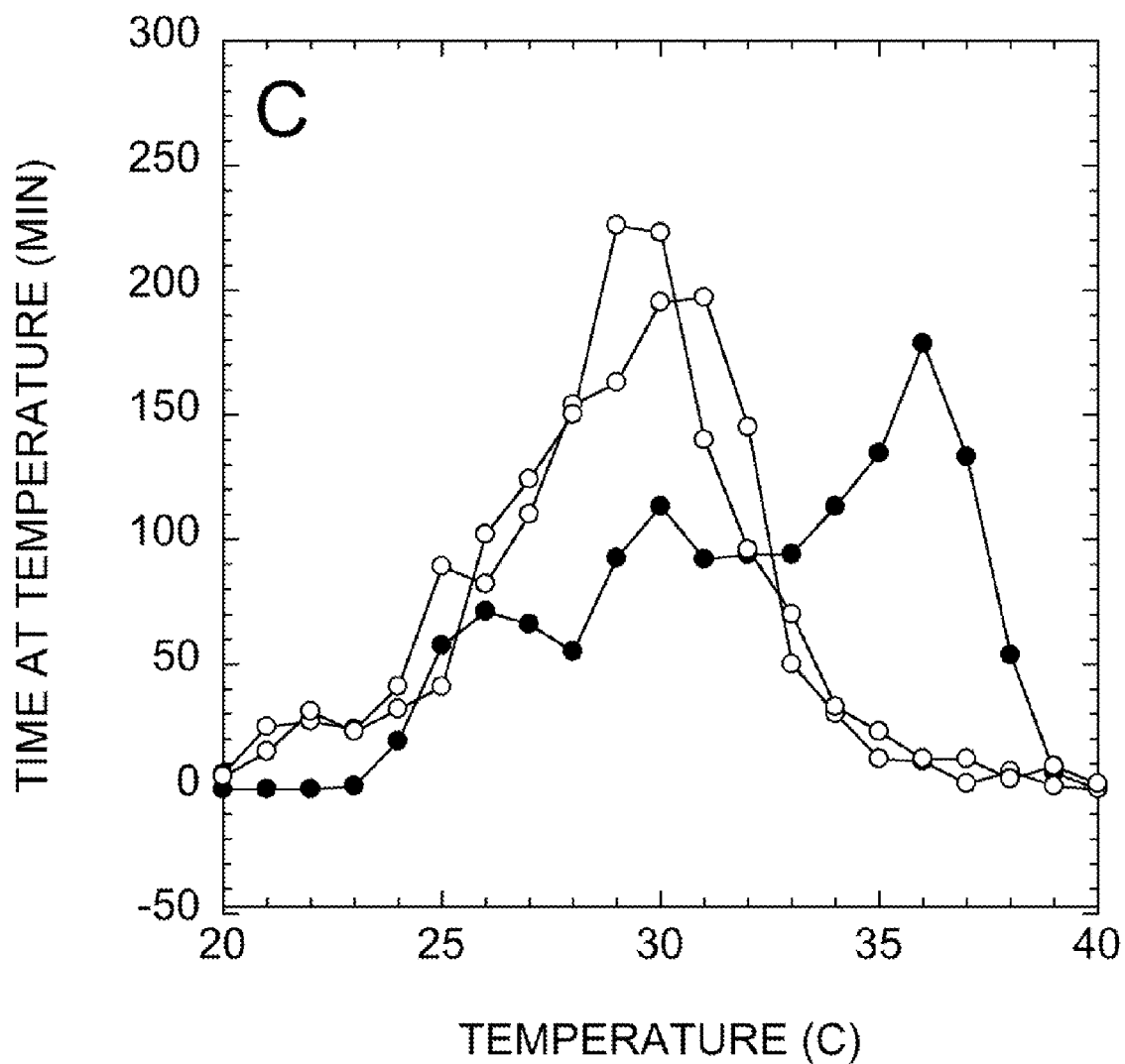
Figure 1D:
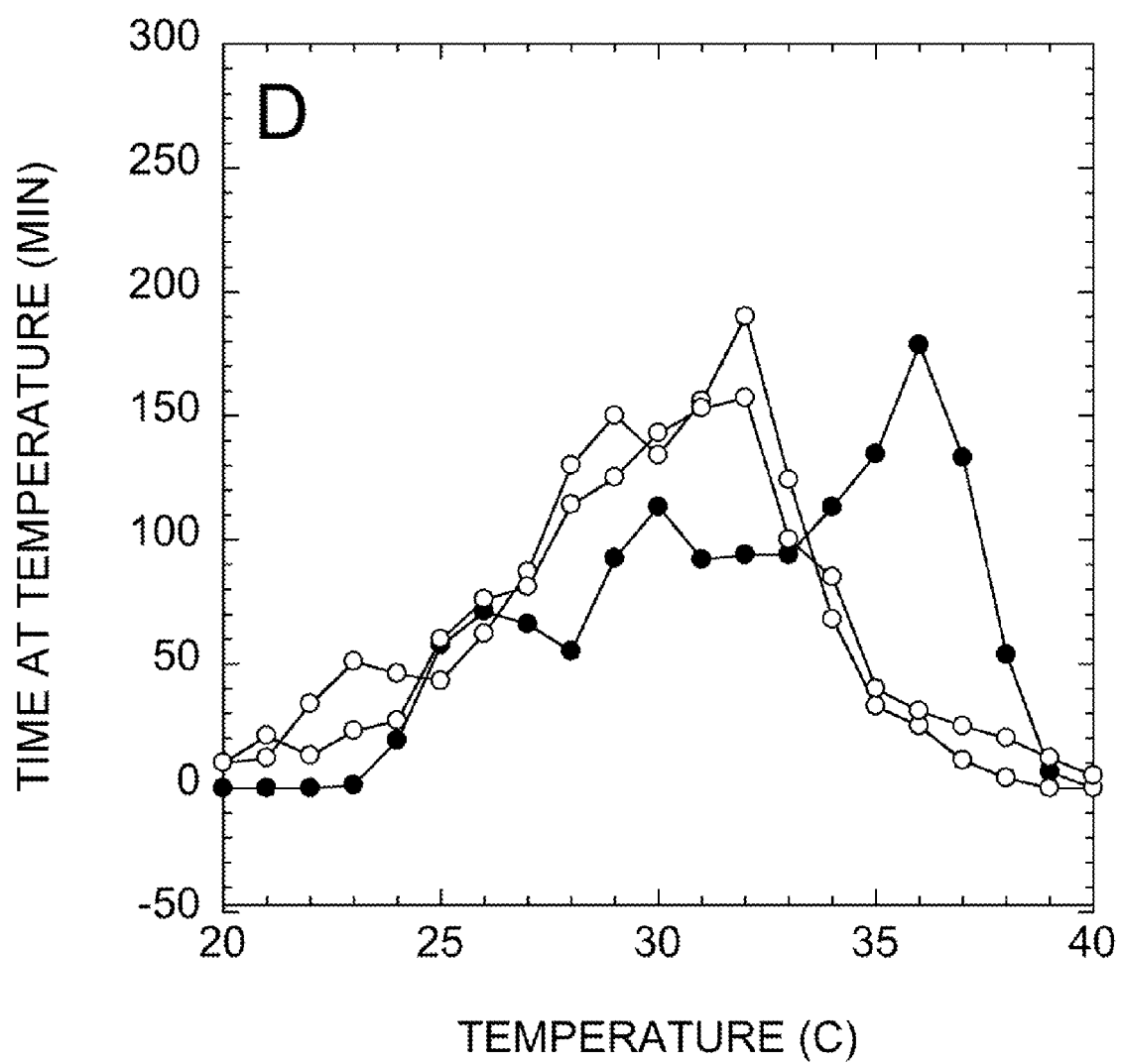

There are desirable agronomic outcomes of plant water and thermal stresses. These desired agronomic outcomes may sometimes be prevented in management systems based on optimal metabolic measures. Thus the ability to manage non-optimal metabolism in some agricultural systems may be of substantial value. Inherent in a non-optimal management approach is the need to be able to 1) reliably identify the non-optimal state and 2) manage the non-optimality in terms of its magnitude and its temporal occurrence. Without being limited thereto, information on several crops in which non-optimal metabolic states result in desirable agronomic outcomes is described below. These examples are only meant to be illustrative and are not exhaustive.

Alfalfa responds morphologically to drought stress with decreases in stem number, stem elongation, and yield. The quality of alfalfa forage produced under drought conditions is often higher than that of the well-watered fields. Halim et al. [1989. Water-stress effects on alfalfa forage quality after adjustment for maturity differences. Agronomy Journal 81(2):189-194] concluded that forage quality of alfalfa increased when plants were grown under continuous water stress. They attributed at least part of the response to changes in the leaf to stem ratio with a contribution from systematic decrease in cell wall content and increased crude protein content in response to water deficits. While water stress can be associated with increased quality in terms of both biomass and seed, there is clearly a level of water deficit that has significant and negative effects on stand survival. Management of alfalfa water stress using a Crop Water Stress Index (CWSI) approach has been reported with limited success.

An early response of grapevines to water stress is a reduction in vegetative growth that serves to maintain the availability of nutrients and metabolites to the fruit. The water deficits reduce the size of the grape berries and result in an increase in the ratio of skin to fruit volume. The skin is the source of many of the metabolites that are desirable components of wine. Thus water deficits can improve the quality of grapes used in wine making. Extreme water deficits can negatively affect vine survival and actually produce anti-quality factors. Thus while moderate and controlled water deficits can have positive effects on grape production, the magnitude of the stress must be monitored to avoid harmful stresses.

Olive yield is related to increased irrigation while oil quality is enhanced by water deficits. The balance between the quantity and quality in olives can be achieved through careful and precise water management. There is a need for improved water monitoring/management tools for olive orchards.

There are crops in which there is a balance between increasing water deficits (non-optimal water status) and a desired agronomic outcome achieved through non-optimal metabolism. In each instance it has been suggested that when water deficits are appropriately managed it may be possible to improve the desired agronomic outcome while reducing the amount of water applied. This balance suggests the opportunity to use controlled water deficits (non-optimality) as a means to offset water stress-related yield reductions with stress-related improvement in agronomic outcomes. The extent to which the negative effects of water deficits can be offset by improvements in agronomic outcomes, while promising, is largely unachieved.

The concept of a desirable non-optimal metabolic state versus strict biological optimality is central to metabolic management in plants. Biological optimality refers to the metabolic activity of the plant under conditions where resources are not limiting. It is what the plant does when it is allowed to grow and develop under optimal conditions. A desirable non-optimal metabolic state is an anthropogenic determination based upon a desirable agronomic outcome defined in terms of a plant product. However, as previously stated, in some plants, biological optimality does not necessarily result in a desired agronomic outcome.

Historically the goal of irrigation management has been to prevent the development of water deficits i.e. the attainment and maintenance of an optimal state. This prevention approach tends to promote over-irrigation at the expense of irrigation efficiency. In settings where irrigation is not limited, a stress prevention approach is based mostly on management options and economic considerations.

In many agricultural production systems, limited water resources preclude the option of an optimality-based stress prevention irrigation strategy. Under such conditions the amount of water available for irrigation, while insufficient for stress prevention, may in many instances provide an opportunity for active stress management.

While in many regions, in the past, irrigation management has been focused on stress prevention, in the future, stress management may become a desirable option. As previously stated, stress-based irrigation management will require; an ability to detect stress, an ability to quantify stress, and an ability to manage stress. A major problem in this approach is that the ability to reliably detect and quantify water deficits in plants is often limited. Measurements of soil moisture can provide useful indications of the amount of water potentially available to the plant and its location in the soil profile. Management of water through ET-based methods, while useful on a seasonal time scale, is often not sensitive enough for quantifying plant water deficits on short time intervals (hours to days). Canopy temperature, measured on a continuous basis, on sub-hour intervals (typically 15-minutes) can provide a temporally sensitive indicator of plant water use and status. On a daily irrigation interval in cotton, canopy temperature can reliably detect irrigation differences on the level of 1 mm/day.

In addition to agronomic crop production in field scenarios, there are plants that are grown under controlled environments within glasshouses. Under such conditions the control of environmental conditions and irrigation management are possible on a finer scale than in field crops and limitations on water availability may be practically nonexistent. In spite of these positives there is often a need to control irrigation and metabolism to achieve desired agronomic outcomes. Saturated soil conditions due to over-irrigation can lead to insect and disease pressure that can be mitigated by maintaining plants at a less-than-optimal water status. Additionally, desired agronomic outcomes may be associated with non-optimal metabolic states in the same manner a field crops.

Thus for a range of plant production systems, there may be value in the ability to actively manage plant stress. Canopy temperature measurements, coupled with non-optimal metabolic setpoint temperatures, will provide a reliable and scientifically based means to improve the ability to achieve desired agronomic outcomes.

The process and apparatus of this invention may be used for managing irrigation for a wide variety of plants in both field and controlled environments. The method can be applied to a wide range of field crops, vegetables, fruits and fruit trees, turf grass, golf courses, urban landscapes and horticultural crops. Without being limited thereto, examples of plants which may be managed using this invention include cotton, sorghum, wheat, alfalfa, legumes, beans, soybeans, peanuts, olives, rice, peppers, cucumbers, tomatoes, grapes, potatoes, peach trees, orange trees, pecan trees, ornamental flowers, roses and petunias. While this approach is particularly well-suited to plant management in greenhouses and controlled environments, the use of the invention is not limited to any specific climate, production system or type of irrigation system. In addition to its application in arid and semi-arid regions, the invention may be used in non-arid or humid regions to identify the need for supplemental irrigation. Irrigation systems of particular interest that may be used with this invention include, but are not limited to, drip, sprinkler, LEPA [low energy precision application, as described by Lyle and Bordovsky (1981, Trans ASAE, 24:1241-1245), and Bordovsky and Lyle (1988, ASAE Paper no. 88-2097, ASAE, St. Joseph, Mich.), the contents of each of which are incorporated by reference herein], and flood irrigation.

Determination of a plant's need for water in accordance with this invention is based upon a water-deficit stress setpoint temperature that is defined relative to a desired agronomic outcome that is a result of a stressed, non-optimal metabolism. This desirable stressed state is not coincident with a biologically optimal metabolic condition of the plant. Biologically optimal plant metabolic conditions and the determination of optimal metabolic temperatures for providing optimal plant metabolic conditions have been described in the prior art, such as in Upchurch et al. (U.S. Pat. No. 5,539,637, the contents of which are incorporated by reference herein). In contrast, the water-deficit stress setpoint temperature used herein is not optimal for metabolism of the plant. Rather, the water-deficit stress setpoint temperature used herein is defined herein as the approximate plant temperature that is associated with (correlated to) a desired, predetermined plant stress level (which may be hydrological or thermal). Thus, at plant temperatures equal to or below this water-deficit stress setpoint temperature (but above the optimal metabolic temperature), the plant will be at the desired stress level, and therefore result in a desirable agronomic outcome which is not correlated to optimal metabolism of the plant. However, at plant temperatures above this water-deficit stress setpoint temperature, the plant is in a non-desired, excessively stressed level. Under these excessively stressed conditions, cooling by irrigation to reduce the stress to the desired level is warranted, unless the atmospheric humidity is restrictive to cooling. This water-deficit stress setpoint temperature can be used to maintain specific water-deficit stresses at any distinct plant developmental stage.

The water-deficit stress setpoint temperature for a particular plant of interest may be identified by users of the technology through a variety of means that could include empirical analyses and physiological/metabolic analyses. The setpoint temperatures are specific to the plants used and the desired agronomic outcomes. A variety of techniques may be used to identify the level of stress necessary to provide a given desired agronomic outcome or response for the plant, and the water-deficit stress setpoint temperature associated with that stress level, for use herein. Without being limited thereto, in a preferred embodiment, plant stress may be quantitatively measured by determining the yield of quantum efficiency ($F_v/F_m$, the ratio of variable to maximum fluorescence of leaf material, also referred to as the chlorophyll fluorescence yield) for the plant of interest. Although the determination of $F_v/F_m$, is widely known [e.g., Maxwell and Johnsen, 2000. Chlorophyll fluorescence—a practical guide. J. Exp. Botany. 51(345):659-668] in this invention it is used to measure the health or stress level of the plant, not photosynthesis. In accordance with this embodiment, we have found that plant stress can be readily managed by identifying the setpoint temperature which is associated with a specified value or range of values of $F_v/F_m$, for the plant of interest. Specifically, the desired stress level comprises the level associated with (correlated to) an $F_v/F_m$, value between 0.2 and 0.55, preferably between 0.25 and 0.55 (measured under the fluorescence assay conditions described below). In contrast, healthy plants grown under biologically optimal metabolic conditions will typically exhibit an $F_v/F_m$ value between approximately 0.1 to 0.15 or lower (measured under the same fluorescence assay conditions). Thus, in accordance with this preferred embodiment, the water-deficit stress setpoint temperature is that temperature which is associated with an $F_v/F_m$ value between 0.2 and 0.55, more preferably between 0.25 and 0.55. The choice of the particular desired $F_v/F_m$ value may be at the discretion of the user and may vary with the plant of interest, the available irrigation system and the amount of water available for irrigation. By way of example and without being limited thereto, the water-deficit stress setpoint temperature will most preferably be associated with an $F_v/F_m$ equal to approximately 0.25. The precise setpoint temperature associated with the selected $F_v/F_m$ value may be determined empirically.

Because it is desired to maintain the plants in the stressed, non-optimal metabolic condition, irrigation (or the irrigation signal) is terminated or discontinued after the measured temperature falls to a point less than or equal to the water-deficit stress setpoint temperature. As the setpoint temperature is associated with the desired plant stress level, the termination of irrigation at this time will have the effect of retaining the plant in the desired stressed condition, but not placing the plant in an optimal metabolic condition (as described above).

Techniques for the determination of $F_v/F_m$ have been described by Maxwell and Johnson (ibid), Burke (2007, ibid), and Burke et al. (2010, ibid), the contents of each of which are incorporated by reference herein. However, the conditions under which the fluorescence assays of $F_v/F_m$ are conducted may significantly affect the results. Thus, we have found that the fluorescence assay should be conducted by measuring the fluorescence of the fresh leaf tissue collected from fully extended leaves of the plant, which tissue has first been incubated in the dark for 30 minutes at 40° C., immediately followed by a 30 minute light recovery at 25° C. By way of illustration and without being limited thereto, the determination of $F_v/F_m$ is conducted as follows:

collect one $cm^2$ leaf punch samples from fully extended leaves, immediately placing the tissue samples into specimen containers with distilled water, place the tissue samples onto moistened filter paper in a glass dish such as Pyrex (Corning Inc., NY) covered with a $CO_2$ permeable plastic wrap (such as Glad wrap, Glad Products Co., Oakland, Calif.) or other material, incubate the tissue samples in the dark for 30 minutes at 40° C., expose the tissue samples to light at room temperature, 25° C., for 30 minutes, and measure $F_v/F_m$ using any standard fluorometer.

Development of plant canopy temperatures in excess of the non-optimal metabolic setpoint temperature serves as an indicator of a non-desirable water status and temperature, and hence the need for application of irrigation water to achieve transpirational cooling. However, plant canopy temperatures are affected not only by air temperature, but by other environmental factors as well, including the atmospheric humidity. If the relative atmospheric humidity is sufficiently high, transpirational cooling of the plant may be restricted. Applying water under these restrictive conditions will not effectively lower the canopy temperature. In general, for an evaporative surface, the wet bulb temperate provides a measure of the absolute lower temperature limit to which the surface may be cooled. This wet bulb temperature, which may be readily measured with a psychrometer or wet bulb thermometer, is a function of the ambient relative humidity and air temperature. However, because of the geometry of plant leaves, it is impossible for them to cool by evaporation to the wet bulb temperature. At any existing condition of air temperature and relative humidity, the potential of a non-stressed plant canopy temperature to approach the wet bulb temperature is controlled by wind speed, canopy structure and ambient radiation. We have determined that a plant canopy is likely to only cool to about 1° to 5° C., usually to approximately 2° C., above the ambient wet bulb temperature. Therefore, the setpoint or limiting humidity for use in this invention has been defined as the value that is equivalent to a wet bulb temperature that is about 1° to 5° C. (preferably approximately 2° C.) below the predetermined threshold canopy temperature for the plant of interest. It is understood that the value of the limiting humidity may be expressed simply as this wet bulb temperature, or as the dew point temperature, or as the relative or absolute humidity, at a specified air temperature, which correspond to this wet bulb temperature.

In a preferred embodiment, limiting humidity conditions can be calculated by means of a device which measures humidity and a device that measures air temperature. Relative humidity sensors, psychrometers and dew point devices are all suitable. In this process, values of the limiting relative humidity at a range of air temperatures and at various threshold temperatures may be predetermined using standard psychrometric relationships. Generally, once the non-optimal metabolic temperature setpoint for the plant of interest has been selected, a threshold wet bulb temperature may be designated as the non-optimal metabolic temperature setpoint temperature minus between about 1° to 5° C. (usually 2° C.). Using psychrometric relationships or charts, the relative humidity which corresponds to this threshold wet bulb temperature may be determined over a range of air temperatures; these humidity values represent the limiting humidity at each respective air temperature. During use, if the measured relative humidity is greater than or substantially equal to the predetermined limiting humidity at the given threshold canopy temperature and current air temperature, then the humidity is restrictive to cooling. Descriptions of psychrometric relationships and charts which may be used herein are described, for example, in Brooker (1967, Mathematical Model of the Psychrometric chart, Trans. of the ASAE, 1967: 558-563), Goff (1949, Trans. ASHVE J. Section, Heating, Piping, Air Conditioning, 55,118), Payne et al. (1972, Modeling of the Psychrometric Chart, Univ. of Kentucky Agric. Engin. Tech. Series, 1972 No. 4:1-14), Wilhelm (1976, Numerical Calculation of Psychrometric Properties in SI Units, Trans. of the ASAE, 1976:318-325), or Bagnoli et al. (Psychrometry, Evaporative Cooling, Air Conditioning, and Refrigeration, IN: Chemical Engineers Handbook, fifth ed., Perry and Chilton (Ed.), McGraw-Hill, New York, (1973) pp. 12-1 to 12-12), the contents of each of which are incorporated by reference herein.

The apparatus of the invention includes sensors for measuring the plant temperature and the atmospheric humidity, communicating with a control unit for determining if the plant is in a non-desired metabolic state, as defined by a non-optimal metabolic setpoint temperature, and if irrigation will result in a more non-optimal metabolic state that is linked to a desirable agronomic outcome. Measurements of plant temperatures can be made using any of several devices including thermocouples, thermistors or infrared radiometers (infrared thermometers). An air temperature sensor or thermometer may also be included such as when measuring humidity with other than a wet bulb temperature sensor. In a preferred embodiment, the relative humidity may be measured with a polymer based capacitive sensor having integral temperature correction, and the air temperature may be measured with an RID, thermistor or thermocouple, shielded from direct radiation and mounted to allow ventilation or having a ventilation fan.

A microprocessor based computer control unit having conventional interface hardware is provided for receiving and interpreting the signals from the sensors. The microprocessor includes hardware or software for comparing the measured canopy temperature to the water-deficit stress metabolic setpoint temperature to determine if the plant is at a desired temperature and by extension, in a stressed, non-optimal metabolic state. The microprocessor is also capable of determining if the humidity is sufficiently high to limit transpirational cooling. This determination may only require a simple comparison if the limiting humidity has been inputted, or may also include an algorithm for calculating the limiting relative humidity as described hereinabove. At least one signal generator may be provided in communication with the microprocessor, which is effective for generating and displaying an irrigation signal. Signals may include audible alarms, visible beacons, lights or LEDS, printouts or any combination thereof. Power for the apparatus may be provided using any conventional means, including generators, batteries, and AC electrical connections. Batteries are the preferred power source, and may include an optional solar recharging system. The microprocessor may also include input means such as a plant selector module or manually operated keyboard, for entering the values of the appropriate setpoint temperature, and optionally, the limiting humidity Although irrigation may be manually actuated by the producer in response to the above-mentioned signals, the apparatus may include optional control means for automatically actuating irrigation. Suitable control means should include appropriate electronic circuitry effective for actuating the particular irrigation device in response to the microprocessor. In accordance with this embodiment, automatic control means may replace or be used in conjunction with the signal generator.

Irrigation or water management using the process of this invention may be implemented for any plant and geographical area for which the desired water-deficit stress setpoint temperature and limiting humidity have been determined as described hereinabove.

The following examples are intended only to further illustrate the invention and are not intended to limit the scope of the invention that is defined by the claims.

EXAMPLE 1

The relationship between canopy temperature and plant water status was investigated in cotton using a system based upon this method. Cotton plants, in a greenhouse, were irrigated with a fixed volume of water at an interval that was determined by the canopy temperature for the preceding 5 minutes. Over the 10-day period of the study, the irrigation management; canopy temperature measurement, irrigation decisions, and irrigation events were all fully automated. There was no human intervention over the interval. FIG. 1 shows the distribution of canopy temperatures over the 10-day period for a collection of cotton plants in a greenhouse that were irrigated based on 4 temperature setpoints. Air temperature is shown on each figure as a point of reference. These results demonstrate that canopy temperature can be controlled to optimal and non-optimal (sub and supra) values in an automated manner.

EXAMPLE 2

The relationship between canopy temperature set points and water-deficit stress levels was determined on greenhouse-grown cotton irrigated either with a timed irrigation or with threshold temperature controlled irrigation. This relationship allows one to determine metabolic threshold canopy temperatures to achieve specific plant metabolic stress levels. The resulting plant stress levels of 28° C., 30° C., 32° C. and 34° C. threshold temperatures were determined from analysis of the relationship between canopy temperature and the yield of quantum efficiency (Fv/Fm). Leaf punches (1 square centimeter in size) were harvested from the fifth leaf from the top of the plant. This leaf position was that of the most recently fully expanded leaf on the plant. The punches were transferred to a well in a Costar 3524 24-well cell culture cluster (Corning Inc., Corning, N.Y.) that had been half filled with water. The lid was returned to the cell culture plate immediately following the addition of more leaf punches. This process was repeated until samples from all treatments had been harvested. Upon returning to the lab, the leaf punches were placed on moistened Model 583 Gel Dryer Filter Paper (Bio-Rad Laboratories, Hercules, Calif.) in a Pyrex baking dish. The leaf punches and filter paper were covered with $CO_2$ permeable Glad Cling Wrap (The Glad Products Company, Oakland, Calif.) and pressed flat with a speedball roller for Microseal film (MJ Research, Inc., Waltham, Mass.) to remove air bubbles and ensure good contact between the tissue and filter paper. The yield of quantum efficiency (Fv/Fm) was determined using an Opti-Science OS1-FL Modulated Fluorometer. Samples were placed in the dark in a VWR Model 2005 incubator (Sheldon Manufacturing, Inc., Cornelius, Oreg.) set to 40° C. The samples were challenged for 30 min in the 40° C. incubator. Following the temperature challenge, the Pyrex baking dish was removed from the incubator, placed on the laboratory bench (25° C.) for 30 min, and then the yield of quantum efficiency was determined.

TABLE 1

Cotton irrigation summary for a 10-day study of four temperature threshold irrigation treatments and a timer-based irrigation control.

| Parameter | Timed Control | TT28° C. | TT30° C. | TT32° C. | TT34° C. |
|---|---|---|---|---|---|
| Irrigation water applied (liters) | 10 | 13.8 | 11.6 | 7.1 | 5.8 |
| Irrigation amount compared to Control | 1.0 | 1.38 | 1.16 | 0.71 | 0.58 |
| Irrigation as a fraction of full irrigation (Temperature Threshold: 28° C.) | 0.72 | 1.0 | 0.83 | 0.51 | 0.41 |

The water-stress levels of cotton plants irrigated with temperature thresholds of 28° C., 30° C., 32° C. and 34° C. were determined by analyzing the change in the efficiency of quantum yield (Fv/Fm) from initial values of 0.75 to 0.8 prior to the heat treatment to values as low as 0.37. The lower the Fv/Fm values following the heat treatment, the less stressed the plant was at the time of the assay.

Figure 2:
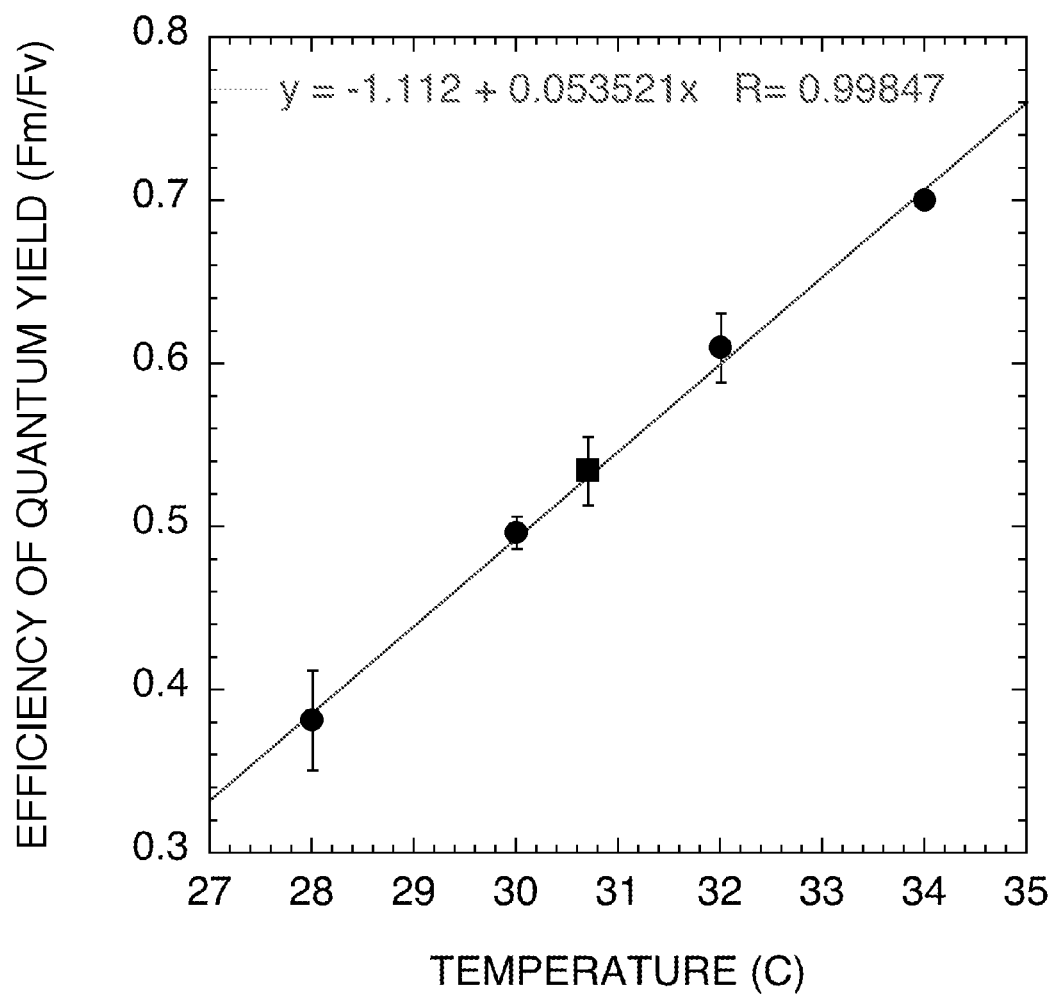
FIG. 2 is a graph of the water-stress levels [Burke. 2007. Evaluation of Source Leaf Responses to Water-Deficit Stresses in Cotton Using a Novel Stress Bioassay. Plant Physiol. 143:108-121. Epub 2006 Oct. 27; Burke et al. 2010. Selection system for the "stay-green" drought tolerance trait in sorghum germplasm. Agronomy J. 102(4):1118-1122, the contents of each of which are incorporated by reference herein] of greenhouse-grown cotton plants irrigated with temperature thresholds of 28° C., 30° C., 32° C. and 34° C. (closed circles) and a timer-based irrigation treatment (closed square).
Figure 3:
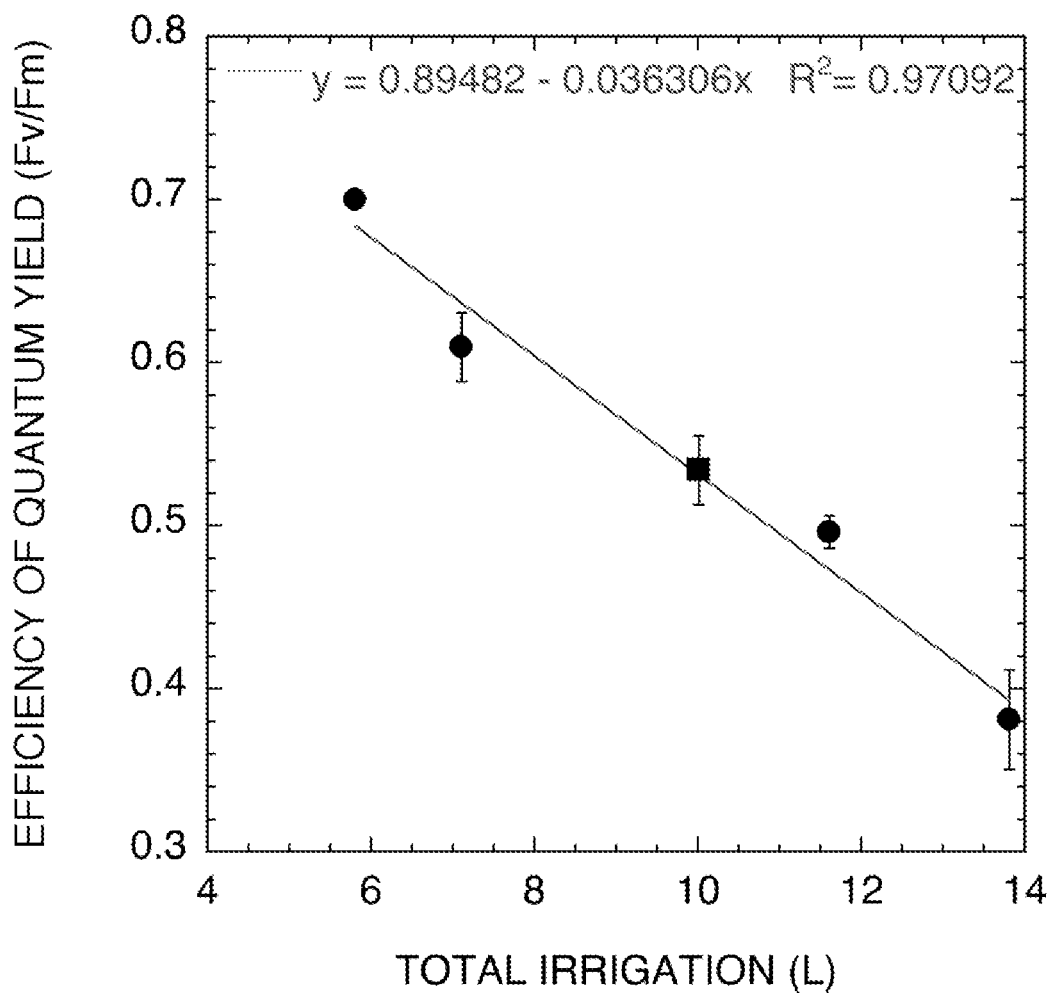
FIG. 3 shows the relationship between water-stress levels (Burke, 2007; Burke et al., 2010) of greenhouse-grown cotton plants and the amount of irrigation received.

FIG. 2 showed a linear relationship between the efficiency of quantum yield values and the four set point temperatures (closed circles) used in this study. The lower the temperature threshold, the lower the water-deficit stress in the cotton plant. As threshold temperatures increased, the amount of irrigation received over a ten-day test period was reduced. This is exemplified by the decline in irrigation volumes from a total of 13.8 liters/10 days to a low of 5.8 liters/10 days. Plants irrigated by timer-controlled irrigations received only 10 liters/10 days and their stress levels were equivalent to a 30.8° C. set point temperature. FIG. 3 shows the relationship between applied irrigation volumes and the resulting water-deficit stress levels within the plant. The lower the quantity of water applied to the plants, the greater the resulting water-deficit stress experienced by the plant. Because of the relationship between set point temperature and the resulting level of irrigation supplied to the plant, we are able to select specific stress levels within the plant by controlling irrigation to selected threshold temperatures.

EXAMPLE 3

The relationship between canopy temperature set points and water-deficit stress levels was determined on field-grown irrigated cotton. The water-stress levels of cotton plants irrigated with temperature thresholds ranging from 29° C. to 39° C. were determined by analyzing the change in the efficiency of quantum yield (Fv/Fm) from initial values of 0.75 to 0.8 prior to the heat treatment to values as low as 0.22. The lower the Fv/Fm values following the heat treatment, the less stressed the plant was at the time of the assay.

Figure 4:
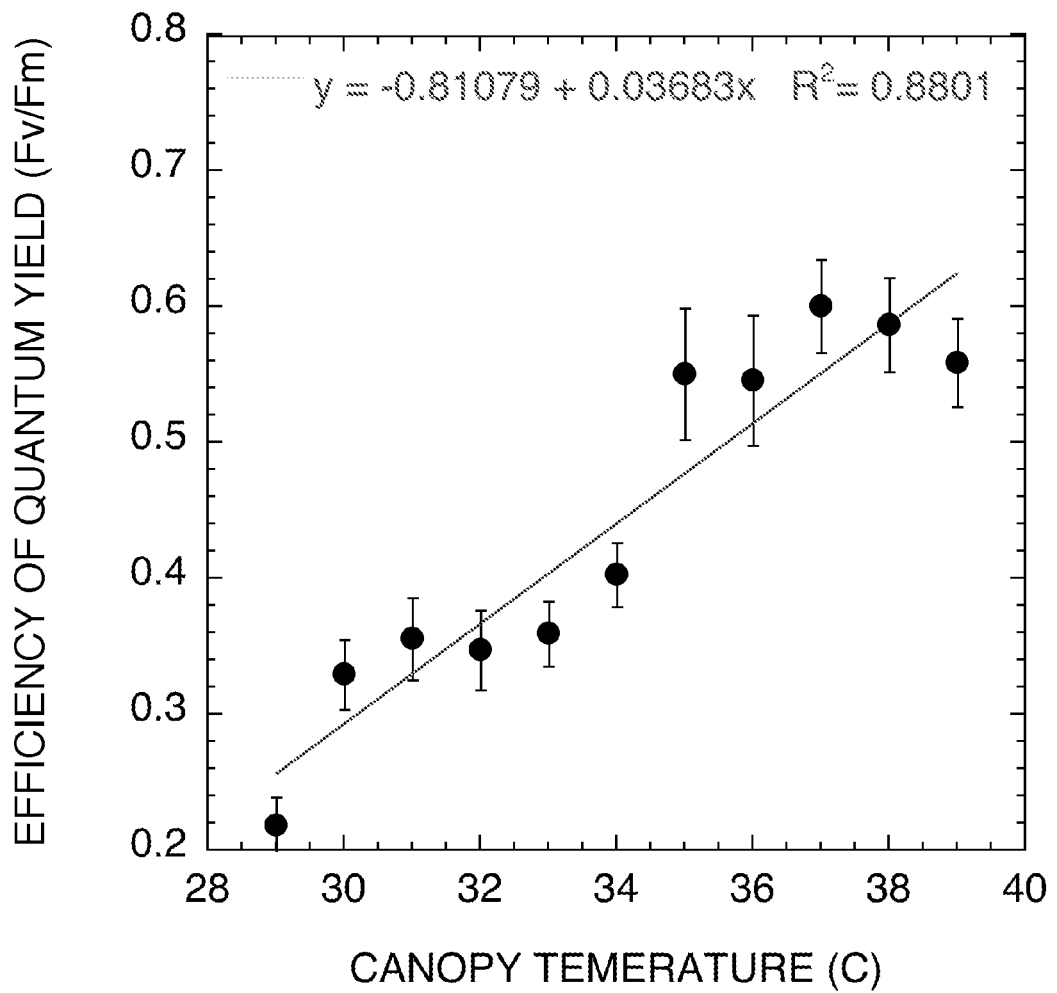
FIG. 4 is a graph of the water-stress levels (Burke, 2007; Burke et al., 2010) of field-grown cotton plants and mid-day canopy temperatures.
Figure 5:
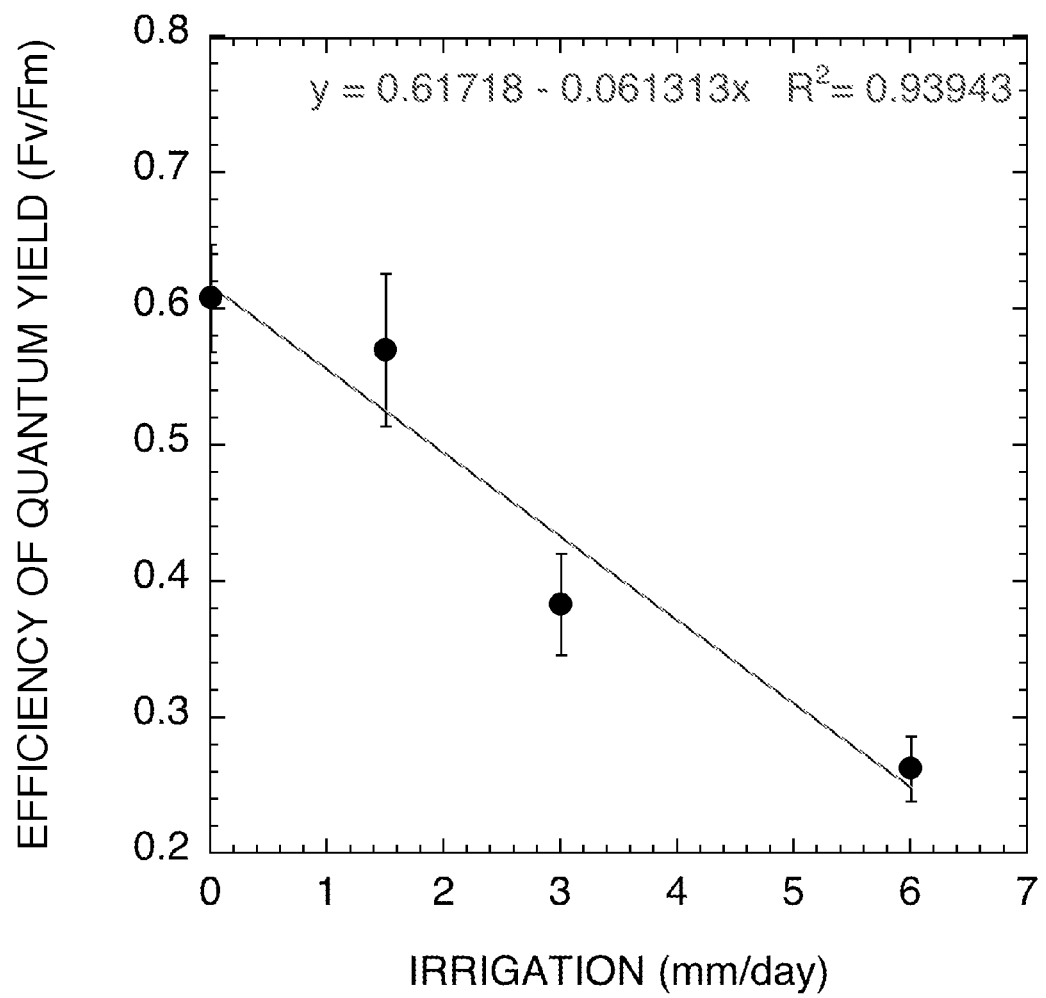
FIG. 5 shows the relationship between water-stress levels (Burke, 2007; Burke et al., 2010) of field-grown cotton plants and the amount of daily irrigation received.
Figure 6A:
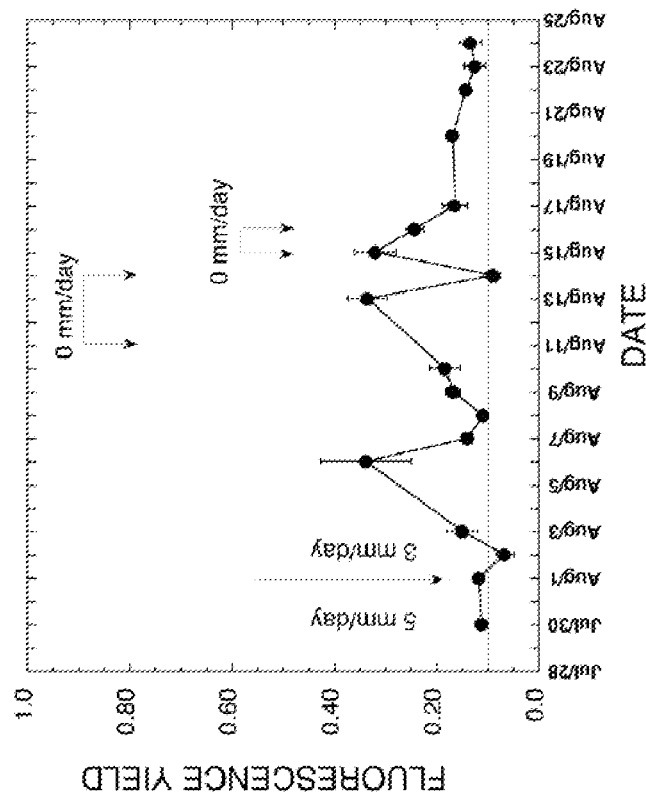
FIGS. 6A and B show the water stress levels of two different recombinant inbred cotton lines. Both lines were initially provided with 5 mm water/day by sub-surface drip irrigation, which was subsequently reduced to 3 mm water/day. The line shown in FIG. 6A was the poorest yielding line and exhibited the highest stress, while the line shown in FIG. 6B was the highest yielding and exhibited less stress.
Figure 6B:
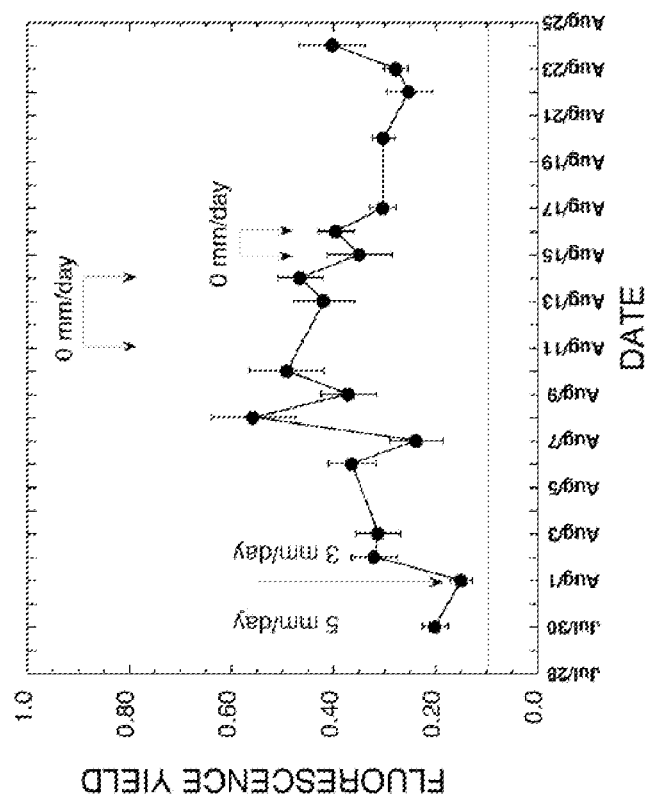

FIG. 4 showed the relationship between the efficiency of quantum yield values and the canopy temperatures (closed circles) used in this study. The lower the temperature threshold, the lower the water-deficit stress in the cotton plant. FIG. 5 shows the relationship between applied irrigation volumes and the resulting water-deficit stress levels within the plant. The lower the quantity of water applied to the plants, the greater the resulting water-deficit stress experienced by the plant. Because of the relationship between set point temperature and the resulting level of irrigation supplied to the plant in the field, we are able to select specific stress levels within the plant by controlling irrigation to selected threshold temperatures.

It is understood that the foregoing detailed description is given merely by way of illustration and that modifications and variations may be made therein without departing from the spirit and scope of the invention.

We claim:

1. A method for managing water deficit stress in plants comprising:
    a) measuring the temperature of a target plant with a temperature measuring device:
    b) measuring the atmospheric humidity in the vicinity of said plant with a humidity measuring device:
    c) using a microprocessor to compare said temperature of said plant with a water-deficit stress setpoint temperature for said plant that is defined as the approximate plant temperature that is associated with a predetermined plant stress level, wherein said predetermined plant stress level is not optimal for metabolism of said plant, and said predetermined stress level comprises the level associated with an efficiency of quantum yield measurement, Fv/Fm. between 0.2 and 0.55, measured from fully extended leaf tissue from said plant and following a 30 minute dark incubation of said tissue at 40° C. and a 30 minute light recovery at 25° C., and then determining if said humidity is restrictive to plant cooling; and
    1) returning to said step (a) if either: (i) the measured plant temperature is less than or equal to said setpoint temperature, or (ii) said humidity is restrictive to plant cooling; or so that when the measured plant temperature is greater than said setpoint temperature and said humidity is not restrictive to plant cooling; then,
    2) generating and displaying an irrigation signal or initiating irrigation if the measured plant temperature is greater than said setpoint temperature and said humidity is not restrictive to plant cooling.

2. The method of claim 1 further comprising terminating said irrigation signal and irrigation when said measured plant temperature is less than or equal to said setpoint temperature.

3. The method of claim 2 further wherein said irrigation signal and irrigation are terminated while said plant is stressed and before said plant is in an optimal metabolic condition.

4. The method of claim 1 comprising said initiating irrigation if said measured plant temperature is greater than said setpoint temperature and said humidity is not restrictive to plant cooling.

5. The method of claim 4 further comprising terminating said irrigation when said measured plant temperature is less than or equal to said setpoint temperature.

6. The method of claim 5 further wherein said irrigation is terminated while said plant is stressed and before said plant is in an optimal metabolic condition.

7. The method of claim 1 wherein said plant is selected from the group consisting of field crops, vegetables, turf grass, fruits and fruit trees, and horticultural crops.

8. The method of claim 7 wherein said plant is selected from the group consisting of cotton, sorghum, wheat, alfalfa, grapes, olives, rice, legumes, beans, soybean, peanuts, peppers, cucumbers, tomatoes, potatoes, peach trees, orange trees, pecan trees, ornamental flowers, roses and petunias.

9. The method of claim 1 wherein said temperature of said target plant is measured repeatedly over a time period of interest.

* * * * *